(12) United States Patent
Hornback

(10) Patent No.: US 11,591,943 B2
(45) Date of Patent: Feb. 28, 2023

(54) SERVICEABLE CATALYST AND MIXER UNIT FOR VEHICLE EXHAUST SYSTEM

(71) Applicant: Faurecia Emissions Control Technologies, USA, LLC, Columbus, IN (US)

(72) Inventor: Jerome Hornback, Indianapolis, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 196 days.

(21) Appl. No.: 16/834,353

(22) Filed: Mar. 30, 2020

(65) Prior Publication Data
US 2021/0301704 A1 Sep. 30, 2021

(51) Int. Cl.
*F01N 3/20* (2006.01)
*B01D 53/90* (2006.01)
*B01D 53/94* (2006.01)
*F01N 3/021* (2006.01)
*F01N 3/28* (2006.01)

(52) U.S. Cl.
CPC .......... *F01N 3/2066* (2013.01); *B01D 53/90* (2013.01); *B01D 53/944* (2013.01); *B01D 53/9431* (2013.01); *F01N 3/021* (2013.01); *F01N 3/2892* (2013.01); *F01N 2610/1453* (2013.01)

(58) Field of Classification Search
CPC .. F01N 3/2066; F01N 3/2892; F01N 13/0097; F01N 13/18; F01N 2450/30; F01N 2610/02; F01N 2610/1453; F01N 3/021; F01N 3/035; F01N 3/106; F01N 3/24; B01D 53/9431

USPC ............................................................ 60/274
See application file for complete search history.

(56) References Cited

U.S. PATENT DOCUMENTS

| 10,883,405 B1 * | 1/2021 | Hornback | F01N 13/1805 |
| 10,914,218 B1 * | 2/2021 | Chapman | F01N 13/009 |
| 2008/0264048 A1 | 10/2008 | Nishiyama et al. | |

(Continued)

FOREIGN PATENT DOCUMENTS

| CN | 106121779 A | * 11/2016 | F01N 11/00 |
| CN | 206309452 U | * 7/2017 | F01N 3/28 |

(Continued)

OTHER PUBLICATIONS

English translation of Japanese Patent Application Publication No. JP 206309452 U (Jul. 7, 2017) (Year: 2017).*

*Primary Examiner* — Anthony Ayala Delgado
(74) *Attorney, Agent, or Firm* — Carlson, Gaskey & Olds, P.C.

(57) ABSTRACT

A vehicle exhaust system component, according to an exemplary aspect of the present disclosure includes, among other things, a housing defining an internal cavity to receive exhaust gases, at least one first catalyst received within the internal cavity, at least one filter positioned within the internal cavity downstream of the at least one first catalyst, and at least one second catalyst received within the internal cavity downstream of the at least one filter. A mixer has an inlet that receives exhaust gases exiting the at least one filter and an outlet that directs exhaust gases into the at least one second catalyst. One or more of the at least one first catalyst, the at least one second catalyst, and the at least one filter are serviceable.

23 Claims, 2 Drawing Sheets

(56) References Cited

U.S. PATENT DOCUMENTS

| | | | |
|---|---|---|---|
| 2010/0257850 A1* | 10/2010 | Kowada | F01N 13/08 60/297 |
| 2011/0023452 A1 | 2/2011 | Gisslen et al. | |
| 2014/0334988 A1* | 11/2014 | Stanavich | F01N 13/0097 422/177 |
| 2015/0068400 A1* | 3/2015 | Niaz | F01N 3/08 95/278 |
| 2015/0308316 A1* | 10/2015 | Li | F01N 3/2066 60/295 |
| 2016/0076428 A1* | 3/2016 | Hornback | F01N 13/0097 60/299 |
| 2016/0115847 A1* | 4/2016 | Chapman | B01F 23/2132 60/324 |
| 2016/0194991 A1* | 7/2016 | Clayton, Jr. | B01D 53/944 422/169 |
| 2016/0326937 A1* | 11/2016 | Hornback | F01N 3/021 |
| 2017/0022869 A1* | 1/2017 | Ly | B01F 25/4315 |
| 2018/0340457 A1* | 11/2018 | Prus | B01F 25/4315 |

FOREIGN PATENT DOCUMENTS

| | | | | |
|---|---|---|---|---|
| EP | 3699407 A1 * | 8/2020 | | B60K 13/04 |
| WO | 201975877 A1 | 4/2019 | | |

* cited by examiner

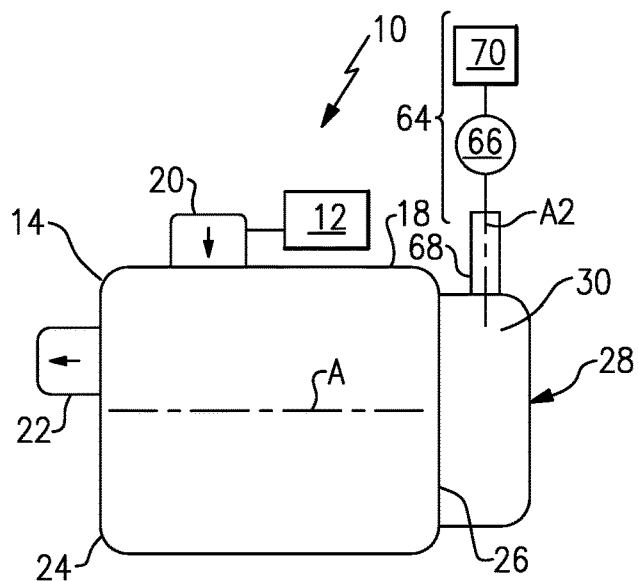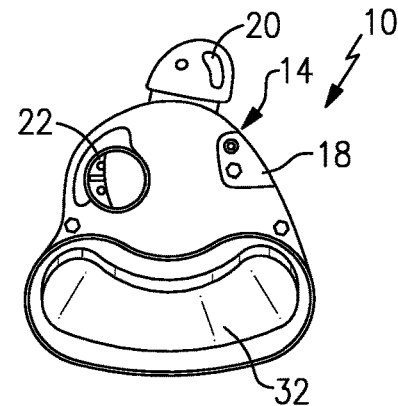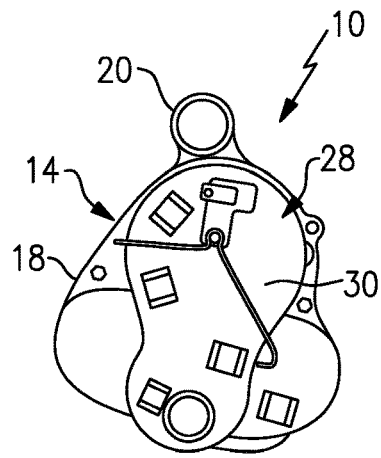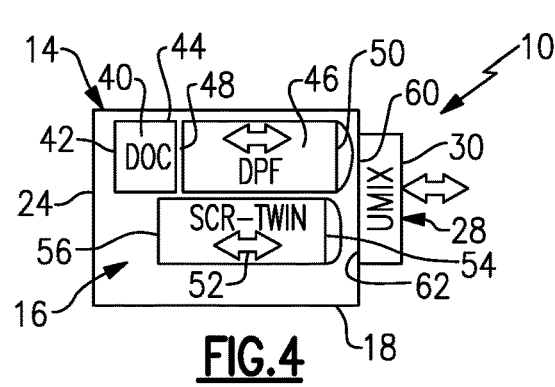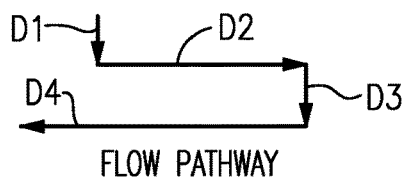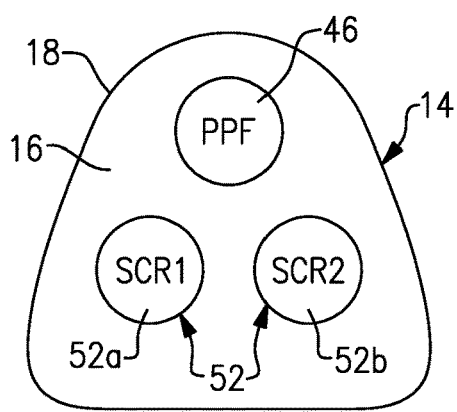

SERVICEABLE CATALYST AND MIXER UNIT FOR VEHICLE EXHAUST SYSTEM

TECHNICAL FIELD

This disclosure relates generally to a serviceable catalyst and mixer unit for a vehicle exhaust system.

BACKGROUND

Vehicles include an exhaust system that has catalyst components to reduce emissions. The exhaust system includes an injection system with an injector or doser that injects a diesel exhaust fluid (DEF), or a reducing agent such as a solution of urea and water for example, upstream of a selective catalytic reduction (SCR) catalyst which is used to reduce NOx emissions. A mixer is positioned upstream of the SCR catalyst and mixes engine exhaust gases and products of urea transformation prior to introduction into the SCR catalyst. The vehicle exhaust system can also include other components such as a diesel oxidation catalyst (DOC) and diesel particulate filter (DPF), for example. Each of the exhaust components can become less effective over time. The combination of exhaust components can be challenging to package and service.

SUMMARY

A vehicle exhaust system component, according to an exemplary aspect of the present disclosure includes, among other things, a housing defining an internal cavity to receive exhaust gases, at least one first catalyst received within the internal cavity, at least one filter positioned within the internal cavity downstream of the at least one first catalyst, and at least one second catalyst received within the internal cavity downstream of the at least one filter. A mixer has an inlet that receives exhaust gases exiting the at least one filter and an outlet that directs exhaust gases into the at least one second catalyst. One or more of the at least one first catalyst, the at least one second catalyst, and the at least one filter are serviceable.

In a further non-limiting embodiment of the foregoing apparatus, the housing has an outer wall that surrounds the at least one first catalyst, the at least one second catalyst, and the at least one filter to enclose the at least one first catalyst, the at least one second catalyst, and the at least one filter within the internal cavity.

In a further non-limiting embodiment of any of the foregoing apparatus, the outer wall extends from a first end to a second end, and wherein the housing includes a housing inlet that receives exhaust gases from a vehicle engine and a housing outlet, and wherein the housing inlet is adjacent the first end and the mixer is positioned at the second end.

In a further non-limiting embodiment of any of the foregoing apparatus, the mixer housing reverses a direction of exhaust gas flow from an outlet of the at least one filter to an inlet to the at least one second catalyst.

In a further non-limiting embodiment of any of the foregoing apparatus, an end wall encloses the housing at the first end and wherein the housing outlet is in the end wall.

In a further non-limiting embodiment of any of the foregoing apparatus, the housing inlet is within the outer wall adjacent to the first end.

In a further non-limiting embodiment of any of the foregoing apparatus, the at least one first catalyst, the at least one second catalyst, and the at least one filter are independently serviceable of each other such that any one of the at least one first catalyst, the at least one second catalyst, and the at least one filter can be selectively removed from the housing for service without removing any remaining of the at least one first catalyst, the at least one second catalyst, and the at least one filter.

In a further non-limiting embodiment of any of the foregoing apparatus, the at least one first catalyst comprises at least one diesel oxidation catalyst, the at least one second catalyst comprises at least one selective catalytic reduction catalyst, and the at least one filter comprises at least one diesel particulate filter.

In a further non-limiting embodiment of any of the foregoing apparatus, the mixer comprises a mixer housing mounted to one end of the housing, and wherein the mixer is independently removable from the housing for service.

In a further non-limiting embodiment of any of the foregoing apparatus, an injection system with an injector or doser is configured to inject a fluid into a mixing chamber provided by the mixer housing.

In a further non-limiting embodiment of any of the foregoing apparatus, the at least one selective catalytic reduction catalyst comprises at least first and second selective catalytic reduction catalysts in parallel with each other.

A vehicle exhaust system component, according to yet another exemplary aspect of the present disclosure includes, among other things, a housing defining an internal cavity for exhaust gases, wherein the housing has an outer wall that extends between first and second ends, at least one first catalyst received within the internal cavity, at least one filter positioned within the internal cavity downstream of the at least one first catalyst, and at least one second catalyst received within the internal cavity downstream of the at least one filter. The outer wall surrounds the at least one first catalyst, the at least one second catalyst, and the at least one filter to enclose the at least one first catalyst, the at least one second catalyst, and the at least one filter within the internal cavity. A mixer has a mixer housing with an inlet that receives exhaust gases exiting the at least one filter and an outlet that directs exhaust gases into the at least one second catalyst. One or more of the at least one first catalyst, the at least one second catalyst, and the at least one filter are serviceable via selective removal from within the internal cavity. An injection system is configured to inject a fluid to mix with exhaust gases within the mixer housing.

In a further non-limiting embodiment of any of the foregoing apparatus, the at least one first catalyst, the at least one second catalyst, and the at least one filter are independently serviceable of each other such that any one of the at least one first catalyst, the at least one second catalyst, and the at least one filter can be selectively removed from the housing for service without removing any remaining of the at least one first catalyst, the at least one second catalyst, and the at least one filter.

In a further non-limiting embodiment of any of the foregoing apparatus, the mixer housing reverses a direction of exhaust gas flow from an outlet of the at least one filter to an inlet to the at least one second catalyst.

In a further non-limiting embodiment of any of the foregoing apparatus, the at least one first catalyst comprises at least one diesel oxidation catalyst, the at least one second catalyst comprises at least first and second selective catalytic reduction catalysts in parallel with each other, and the at least one filter comprises at least one diesel particulate filter.

A method according to still another exemplary aspect of the present disclosure includes, among other things: providing a housing defining an internal cavity to receive exhaust gases; positioning at least one first catalyst within the internal cavity; positioning at least one filter within the internal cavity downstream of the at least one first catalyst; positioning at least one second catalyst within the internal cavity downstream of the at least one filter; reversing a direction of exhaust gas flow from an outlet of the at least one filter to an inlet to the at least one second catalyst with a mixer; and servicing one or more of the first catalyst, the second catalyst, and the filter by removing the one or more of the first catalyst, the second catalyst, and the filter from the housing and replacing or returning the one or more of the first catalyst, the second catalyst, and the filter to the housing.

In a further non-limiting embodiment of the foregoing method, the at least one first catalyst comprises at least one diesel oxidation catalyst, the at least one second catalyst comprises at least first and second selective catalytic reduction catalysts in parallel with each other, and the at least one filter comprises at least one diesel particulate filter.

In a further non-limiting embodiment of any of the foregoing methods, the diesel oxidation catalyst, the first and second selective catalytic reduction catalysts, and the diesel particulate filter are independently serviceable of each other such that any one of the diesel oxidation catalyst, the first and second selective catalytic reduction catalysts, and the diesel particulate filter can be selectively removed from the housing for service without removing any remaining of the diesel oxidation catalyst, the first and second selective catalytic reduction catalysts, and the diesel particulate filter.

In a further non-limiting embodiment of any of the foregoing methods, the housing has an outer wall, and including surrounding the diesel oxidation catalyst, the first and second selective catalytic reduction catalysts, and the diesel particulate filter with the outer wall to enclose the diesel oxidation catalyst, the first and second selective catalytic reduction catalysts, and the diesel particulate filter within the internal cavity.

In a further non-limiting embodiment of any of the foregoing methods, an injection system is configured to inject a fluid into a mixing chamber of the mixer to mix with exhaust gases.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 schematically illustrates one example of a vehicle exhaust system having a serviceable unit with a mixer according to an exemplary disclosure.

FIG. 2 is an end view of the unit of FIG. 1.

FIG. 3 is an opposite end view of the unit of FIG. 1.

FIG. 4 is a schematic side view of exhaust components within a common housing from the unit of FIG. 1.

FIG. 5 is an end view of the exhaust components of FIG. 4.

FIG. 6 shows a flow pathway through the exhaust components of FIG. 4.

DETAILED DESCRIPTION

Figure 7:
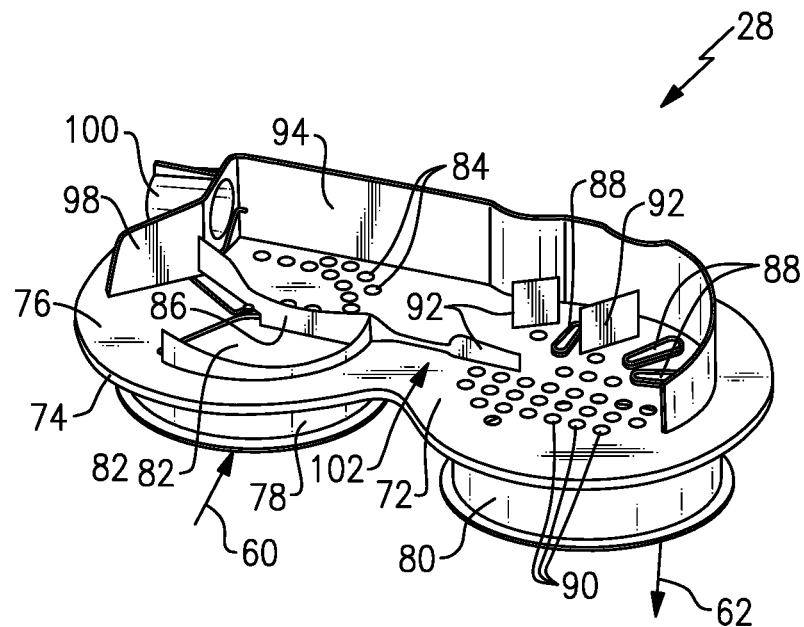
FIG. 7 is a perspective view of one side of the mixer from the unit of FIG. 1 with a mixer cover removed.

This disclosure details an exemplary serviceable catalyst and mixer unit for a vehicle exhaust system.

FIG. 1 shows a vehicle exhaust system 10 that conducts hot exhaust gases generated by an engine 12 through various exhaust components to reduce emission and control noise as known. In one example configuration, a housing 14 provides an internal cavity 16 (FIG. 4) and has an outer wall 18 that surrounds the internal cavity 16 to provide a box-shaped exhaust system unit. An inlet pipe 20 directs engine exhaust gases into the housing 14 and an outlet pipe 22 directs exhaust gases out of the housing 14 to downstream exhaust system components.

The outer wall 18 encloses the internal cavity 16 and extends along a center axis A from a first end 24 to a second end 26. A plurality of exhaust components are received within the common internal cavity 16 to provide the exhaust system unit. In one example, the inlet pipe 20 is adjacent to the first end 24 and a mixer 28 is positioned at the second end 26. The mixer 28 reverses a direction of exhaust gas flow within the unit. The mixer 28 includes a mixer housing or cover 30 (FIG. 3) that encloses the second end 26 of the housing 14. An end wall or end cover 32 (FIG. 2. Encloses the first end 24 of the housing 14. Thus, all of the exhaust components are completely enclosed within the common internal cavity 16 that is enclosed by the outer wall 18, mixer cover 30, and end cover 32. In one example, the outlet to the outlet pipe 22 is in the end cover 32 while the inlet to the inlet pipe 20 is within the outer wall 18 adjacent to the first end 24 of the housing 14.

The components that are enclosed within the internal cavity 16 are comprised of a plurality of exhaust aftertreatment components that comprise one or more catalyst substrate components that are used to reduce emissions. In one example, the exhaust components comprise a diesel oxidation catalyst (DOC) 40 having an inlet 42 at an upstream end and an outlet 44 at a downstream end. Downstream of the DOC 40 is a filter component, such as a diesel particulate filter (DPF) 46 for example, which is used to remove contaminants from the exhaust gas as known. The DPF 46 has an inlet 48 that faces the outlet 44 of the DOC 40 and an outlet 50 that faces the mixer 28. Downstream of the DOC 16 and the DPF 46 is at least one selective catalytic reduction (SCR) catalyst 52 having an inlet 54 that faces the mixer 28 and an outlet 56. The outlet 56 communicates exhaust gases to downstream exhaust components, which eventually exhaust to atmosphere. In one example, the at least one selective catalytic reduction catalyst 52 comprises at least first 52a and second 52b selective catalytic reduction catalysts that are in parallel with each other as shown in FIG. 5.

In one example, the mixer 28 has an inlet 60 that receives exhaust gases exiting the DPF 46 and an outlet that 62 that directs exhaust gases into the SCR catalysts 52a, 52b. As shown in FIG. 6, the mixer 28 reverses a direction of exhaust gas flow from the outlet 50 of the DPF 46 to the inlet 54 to the SCR catalyst 52. In this configuration, exhaust gas flow enters the housing via the inlet pipe 20 in a first direction D1, enters the inlet 42 of the DOC 40 and flows through the DOC 40 and the DPF 46 in a second direction D2, exits the outlet 50 of the DPF and flows through the mixer in a third direction D3, and then exits the mixer 28 to flow through the SCR catalyst 52 in a fourth direction D4 that is opposite of the second direction D2. In one example, the second D2 and fourth D4 directions are parallel to the center axis A, and the first D1 and third D3 directions are perpendicular to the center axis A.

An injection system 64 is used to inject a reducing agent, such as a solution of urea and water for example, into the exhaust gas stream upstream from the SCR catalyst 52 such that the mixer 28 can mix the urea and exhaust gas thoroughly together before entering the catalyst. The injection system 64 includes a fluid supply 66, an injector or doser 68 defining a doser axis A2, and a controller 70 that controls injection of the urea as known. The doser/injector 68 operates as known.

Figure 8:
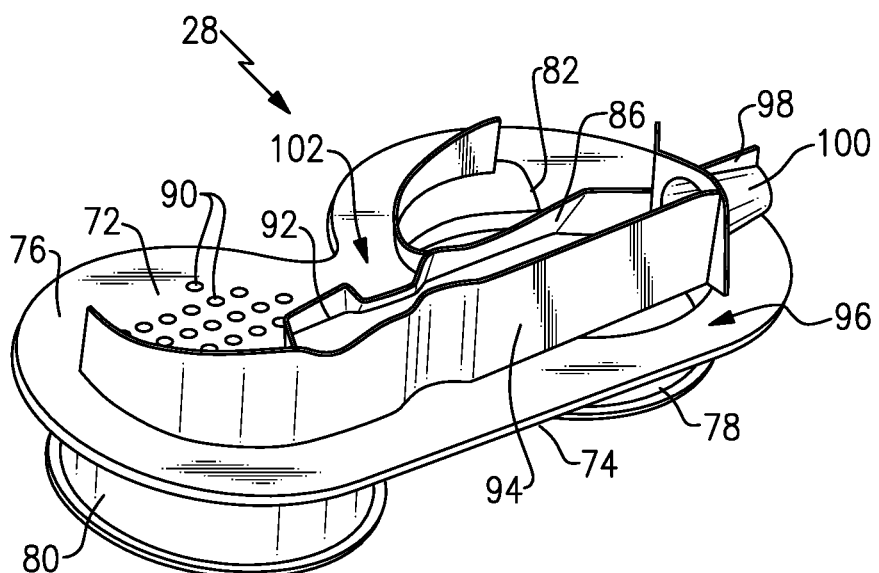
FIG. 8 is a perspective view of an opposite side of the mixer of FIG. 7.

In one example shown in FIGS. 7-8, the mixer 28 comprises a flat plate body 72 having a first side 74 that faces the housing 14 and a second side 76 that faces the mixer cover 30. In one example, the inlet 60 to the mixer 28 comprises an inlet flange 78 that is formed on the first side 74 to face the DPF 46 and an outlet flange 80 that is formed on the first side 74 to face the SCR catalyst 52. In one example, the plate body 72 includes a primary inlet opening 82 through which a majority of the exhaust gas enters the mixer 28 and a plurality of smaller openings 84 through which a remaining portion of the exhaust gas enters the mixer 28. A partition baffle or flange 86 separates the primary opening 82 from the smaller openings 84. In one example, the plate body 72 includes primary outlet openings 88 through which the mixture of exhaust gases and fluid exit the mixer 28 and a plurality of smaller openings 90 through which a remaining portion of the mixture exits the mixer 28. In one example, additional flanges or baffles 92 extend outwardly of the plate body 72 between one or more of the openings 88, 90.

In one example, an inner wall 94 extends outwardly of the second side 76 of the plate body 72 and is spaced from an inner surface of the mixer housing cover 30 by an insulating gap 96. The inner wall 94 extends substantially along an entire length of the mixer plate body 72 from the inlet 60 to the outlet 62. A doser mount 98 is positioned adjacent to the wall 94 near the inlet 60 to support a mixer cone 100. The doser 68 injects fluid into the cone 100 to mix with the exhaust gases. The mixer cover 30 covers the plate body 72 to enclose a mixing chamber 102 that is formed between the second side 76 of the plate body 72 and the cover 30. The mixer shown in FIGS. 7-8 is simply one example of a mixer configuration, and it should be understood that other mixer configurations could also be used to reverse the flow direction.

In the subject disclosure, the exhaust system unit is provided in a compact box configuration with the DOC 40, DPF 46, SCR 52 all housed within a common housing 14 with U-shaped mixer arrangement that mixes injected fluid and exhaust gas while also reversing flow direction. This configuration allows for one or more of the DOC 40, the SCR catalyst 52, and the DPF 46 to be independently serviceable from each other by selective removal from the housing 14 for repair or replacement. This means that the DOC 40, the SCR catalyst 52, and the DPF 46 are all independently serviceable of each other such that any one of them can be selectively removed from the housing 14 for service without removing the other components. Additionally, the mixer 28 is independently removable from the housing 14 for service.

The subject disclosure provides for a serviceable exhaust system box unit for which aftertreatment components, e.g. DOC 40, SCR 52, DPF 46, can be replaced independently as a function of component life to optimize service costs. Further, the pathway length of the flow pathway is optimized and simplified to reduce or eliminate switchback flow within the housing. The back pressure is thus lowered as a function of the pathway length and cross-sections of the components. The mixer is provided at one end to reverse flow direction and to equally feed the pair of SCR catalysts with the mixture of fluid and exhaust gases.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle exhaust system component comprising:
   a housing defining an internal cavity to receive exhaust gases, the housing extending between a first end and a second end;
   at least one first catalyst received within the internal cavity;
   at least one filter positioned within the internal cavity downstream of the at least one first catalyst;
   at least one second catalyst received within the internal cavity downstream of the at least one filter; and
   a mixer having a mixer inlet at one of the first and second ends of the housing that receives exhaust gases exiting a filter outlet of the at least one filter and a mixer outlet that directs exhaust gases into a catalyst inlet to the at least one second catalyst, the filter outlet and the catalyst inlet both being positioned at the one of the first and second ends of the housing, and wherein one or more of the at least one first catalyst, the at least one second catalyst, and the at least one filter are serviceable.

2. The vehicle exhaust system component according to claim 1, wherein the housing has an outer wall that surrounds the at least one first catalyst, the at least one second catalyst, and the at least one filter to enclose the at least one first catalyst, the at least one second catalyst, and the at least one filter within the internal cavity.

3. The vehicle exhaust system component according to claim 2, wherein the outer wall extends from the first end to the second end, and wherein the housing includes a housing inlet that receives exhaust gases from a vehicle engine and a housing outlet, and wherein the housing inlet is adjacent the first end of the housing and the mixer is positioned at the second end of the housing.

4. The vehicle exhaust system component according to claim 3, wherein the housing reverses a direction of exhaust gas flow from the filter outlet of the at least one filter to the catalyst inlet to the at least one second catalyst, and wherein the filter outlet and the catalyst inlet are both at the second end of the housing.

5. The vehicle exhaust system component according to claim 3, including an end wall enclosing the housing at the first end and wherein the housing outlet is in the end wall.

6. The vehicle exhaust system component according to claim 3, wherein the housing inlet is within the outer wall adjacent to the first end.

7. The vehicle exhaust system component according to claim 2, wherein the at least one first catalyst, the at least one second catalyst, and the at least one filter are independently serviceable of each other such that any one of the at least one first catalyst, the at least one second catalyst, and the at least one filter can be selectively removed from the housing for service without removing any remaining of the at least one first catalyst, the at least one second catalyst, and the at least one filter.

8. The vehicle exhaust system component according to claim 7, wherein the at least one first catalyst comprises at least one diesel oxidation catalyst, the at least one second catalyst comprises at least one selective catalytic reduction catalyst, and the at least one filter comprises at least one diesel particulate filter.

9. The vehicle exhaust system component according to claim 8, wherein the mixer comprises a mixer housing mounted to the one of the first and second ends of the housing, and wherein the mixer is independently removable from the housing for service.

10. The vehicle exhaust system component according to claim 9, including an injection system with an injector or doser that is configured to inject a fluid into a mixing chamber provided by the mixer housing.

11. The vehicle exhaust system component according to claim 8, wherein the at least one selective catalytic reduction catalyst comprises at least first and second selective catalytic reduction catalysts in parallel with each other.

12. The vehicle exhaust system component according to claim 1, wherein the mixer comprises a plate body that includes the mixer inlet which comprises at least one inlet opening that directly receives exhaust gas exiting from the filter outlet, and the plate body including the mixer outlet which comprises at least one outlet opening that directly faces the catalyst inlet of the at least one second catalyst.

13. The vehicle exhaust system component according to claim 12, wherein:
the at least one inlet opening comprises a primary inlet opening through which a majority of the exhaust gas enters the mixer and a plurality of smaller inlet openings through which a remaining portion of the exhaust gas enters the mixer, and including a partition baffle or flange that separates the primary inlet opening from the plurality of smaller inlet openings; and
the at least one outlet opening comprises a primary outlet opening through which a mixture of exhaust gases and injected fluid exit the mixer and a plurality of smaller outlet openings through which a remaining portion of the mixture exits the mixer, and including at least one additional baffle or flange that extends outwardly of the plate body between one or more of the primary outlet opening and the plurality of smaller outlet openings.

14. The vehicle exhaust system component according to claim 12, wherein the plate body has a first side that faces the housing and a second side that faces a mixer cover, and including an inner wall that extends outwardly of the second side of the plate body and is spaced from an inner surface of the mixer cover by an insulating gap, and wherein the inner wall at least partially extends around the primary inlet opening, the plurality of smaller inlet openings, the primary outlet opening, and the plurality of smaller inlet openings.

15. The vehicle exhaust system component according to claim 1, wherein the at least one second catalyst comprises a first catalyst substrate and a second catalyst substrate that are parallel to each other, and wherein the housing comprises a box shape, and wherein the first catalyst substrate and the second catalyst substrate are each spaced diagonally from the at least one first catalyst and are non-diagonally spaced from each other.

16. A vehicle exhaust system component comprising:
a housing defining an internal cavity for exhaust gases, wherein the housing has an outer wall that extends between first and second ends;
at least one first catalyst received within the internal cavity;
at least one filter positioned within the internal cavity downstream of the at least one first catalyst;
at least one second catalyst received within the internal cavity downstream of the at least one filter, wherein the outer wall surrounds the at least one first catalyst, the at least one second catalyst, and the at least one filter to enclose the at least one first catalyst, the at least one second catalyst, and the at least one filter within the internal cavity;
a mixer having a mixer housing with a mixer inlet that receives exhaust gases exiting a filter outlet of the at least one filter and a mixer outlet that directs exhaust gases into a catalyst inlet to the at least one second catalyst, the filter outlet and the catalyst inlet both being positioned at one of the first and second ends of the housing, and wherein one or more of the at least one first catalyst, the at least one second catalyst, and the at least one filter are serviceable via selective removal from within the internal cavity; and
an injector or doser that is configured to inject a fluid to mix with exhaust gases within the mixer housing.

17. The vehicle exhaust system component according to claim 16, wherein the at least one first catalyst, the at least one second catalyst, and the at least one filter are independently serviceable of each other such that any one of the at least one first catalyst, the at least one second catalyst, and the at least one filter can be selectively removed from the housing for service without removing any remaining of the at least one first catalyst, the at least one second catalyst, and the at least one filter.

18. The vehicle exhaust system component according to claim 17, wherein the mixer housing reverses a direction of exhaust gas flow from the filter outlet of the at least one filter to the catalyst inlet to the at least one second catalyst, wherein the housing has a housing inlet that is adjacent the first end of the housing and wherein the filter outlet and the catalyst inlet are both at the second end of the housing.

19. The vehicle exhaust system component according to claim 16, wherein the at least one first catalyst comprises at least one diesel oxidation catalyst, the at least one second catalyst comprises at least first and second selective catalytic reduction catalysts in parallel with each other, and the at least one filter comprises at least one diesel particulate filter.

20. The vehicle exhaust system component according to claim 16, wherein the mixer comprises a plate body that includes the mixer inlet which comprises at least one inlet opening that directly receives exhaust gas exiting from the filter outlet, and the plate body including the mixer outlet which comprises at least one outlet opening that directly faces the catalyst inlet of the at least one second catalyst.

21. The vehicle exhaust system component according to claim 20, wherein:
the at least one inlet opening comprises a primary inlet opening through which a majority of the exhaust gas enters the mixer and a plurality of smaller inlet openings through which a remaining portion of the exhaust gas enters the mixer, and including a partition baffle or flange that separates the primary inlet opening from the plurality of smaller inlet openings; and the at least one outlet opening comprises a primary outlet opening through which a mixture of exhaust gases and fluid exit the mixer and a plurality of smaller outlet openings through which a remaining portion of the mixture exits the mixer, and including at least one additional baffle or flange that extends outwardly of the plate body between one or more of the primary outlet opening and plurality of smaller outlet openings.

22. The vehicle exhaust system component according to claim 20, wherein the plate body has a first side that faces the housing and a second side that faces a mixer cover, and including an inner wall that extends outwardly of the second side of the plate body and is spaced from an inner surface of the mixer cover by an insulating gap, and wherein the inner wall at least partially extends around the primary inlet opening, the plurality of smaller inlet openings, the primary outlet opening, and the plurality of smaller inlet openings.

23. The vehicle exhaust system component according to claim 16, wherein the at least one second catalyst comprises a first catalyst substrate and a second catalyst substrate that are parallel to each other, and wherein the housing comprises a box shape, and wherein the first catalyst substrate and the second catalyst substrate are each spaced diagonally from the at least one first catalyst and are non-diagonally spaced from each other.

* * * * *